US007283523B2

(12) United States Patent
Wang et al.

(10) Patent No.: US 7,283,523 B2
(45) Date of Patent: Oct. 16, 2007

(54) METHOD AND SYSTEM FOR APPLYING AN MPLS NETWORK TO SUPPORT QOS IN GPRS

(75) Inventors: Chien-Hsin Wang, Taipei County (TW); Jen-Shun Yang, Taipei (TW); Chien-Chao Tseng, Hsinchu (TW); Jen-Chi Liu, Hsinchu (TW); Jui-Tang Wang, Keelung (TW)

(73) Assignee: Industrial Technology Research Institute, Hsinchu (TW)

( * ) Notice: Subject to any disclaimer, the term of this patent is extended or adjusted under 35 U.S.C. 154(b) by 1023 days.

(21) Appl. No.: 10/601,665

(22) Filed: Jun. 24, 2003

(65) Prior Publication Data

US 2004/0246972 A1 Dec. 9, 2004

(30) Foreign Application Priority Data

Jun. 3, 2003 (TW) ............................. 92104853 A

(51) Int. Cl.
*H04L 12/28* (2006.01)
*H04L 12/56* (2006.01)

(52) U.S. Cl. ................... 370/389; 370/392; 370/349

(58) Field of Classification Search ..................... None
See application file for complete search history.

(56) References Cited

U.S. PATENT DOCUMENTS

| 7,170,869 | B2 * | 1/2007 | Yang et al. ................. 370/328 |
| 2002/0122432 | A1 * | 9/2002 | Chaskar ..................... 370/466 |
| 2002/0126636 | A1 * | 9/2002 | Chen ......................... 370/329 |
| 2004/0017796 | A1 * | 1/2004 | Lemieux et al. ............ 370/349 |
| 2005/0255850 | A1 * | 11/2005 | Auterinen ................ 455/452.2 |

* cited by examiner

*Primary Examiner*—Chirag G. Shah
(74) *Attorney, Agent, or Firm*—Bacon & Thomas, PLLC

(57) ABSTRACT

A method and system for applying a multi-protocol label switching (MPLS) network to support QoS in general packet radio service (GPRS) is disclosed. An E-LSP tunnel with reserved bandwidth is pre-configured between Gateway GPRS Support Node (GGSN) and each Service GPRS Support Node (SGSN), and between any two SGSNs. Before an Mobile Station (MS) wishes to transmit or receive packets, it need to ask its designated SSGN for establishing an on-demand L-LSP from the SGSN to the Corresponding Node (CN). This L-LSP is required to tunnel through the pre-configured E-LSP that was mentioned above and here we apply the label stack technique from MPLS. Therefore, the packets of the on-demand L-LSP can be tunneled through the pre-configured E-LSP to the SGSN in which the MS is located, and then the SGSN is able to recognize and locate the mobile station according to the corresponding label in on-demand L-LSP.

16 Claims, 8 Drawing Sheets

METHOD AND SYSTEM FOR APPLYING AN MPLS NETWORK TO SUPPORT QOS IN GPRS

BACKGROUND OF THE INVENTION

1. Field of the Invention

The present invention relates to the technical field of General Packet Radio Service (GPRS) and, more particularly, to a method and system for applying a multi-protocol label switching (MPLS) network to support Quality of Service (QoS) in general packet radio service (GPRS).

2. Description of Related Art

GPRS is defined to provide transmission service of packet switching and accordingly transmit high rate data and control message in GSM network. FIG. 1 shows a GPRS core network 10 and its architecture, while FIG. 2 shows the signaling plane and transmission plane at the Gn interface of the GPRS architecture, which are five-layer and six-layer structures, respectively. The transmission plane in the Gn interface stack protocol has GPRS Tunneling Protocol (GTP) such that data packets include GTP headers, each having International Mobile Subscriber Identities (IMSI) and Network Layer Service Access Point Identifier (NSAPI) corresponding to a mobile station (MS). Therefore, in this case, SGSN12 can recognize and locate corresponding MS(s) according to the IMSI and NSAPI.

Because GPRS architecture clearly distinguishes between wireless sub-network and wired sub-network, the backbone network formed by the wired sub-network can be constructed by repeatedly utilizing the existing network architecture, such as the Internet, or new network architecture such as Multiple Protocol Label Switching (MPLS). A method for distinguishing between wireless sub-network and wired sub-network is accomplished by two newly defined network nodes, which in FIG. 1 are the Serving GPRS Support Node (SGSN) 12 connected to the base station of the wireless network, and the Gateway GPRS Support Node (GGSN) 13 connected to the external packet switching network 15. SGSN 12 is responsible for tracing and managing the position of a Mobile Station 14 (MS), performing the functions of verification, scheduling and medium access control in packet transmission. GGSN 13 is responsible for routing to the external packet switching network 15 to exchange packets, and utilizing the IP-based GPRS backbone 11 to communicate with the SGSN 12.

For a specific MS 14, GGSN 13 can use IP tunneling techniques to establish a dedicated communicating tunnel particularly between SGSNs 12 that the MS 14 belongs to, such that the MS 14 can access data of the external packet switching network 15. The establishment of this dedicated communicating tunnel and its location and verification information are accomplished by a PDP context activation procedure. This procedure will establish related PDP context tables in MS 14, SGSN 12 and GGSN 13, respectively, for storing information related to the communicating tunnel, mobile station identification and verification, wherein the PDP context tables in SGSN/GGSN are stored with the IP addresses of the GGSN/SGSN corresponding to the two ends of the communicating tunnels. In addition, the GPRS Tunneling Protocol (GTP) in the GPRS protocol defines the GPRS control messages, including control messages related to the PDP context activation procedure, and also defines the packet format and GTP header of the data packet in using IP tunnel techniques. The GTP header includes a set of Tunnel IDs (TIDs) for use by SGSN to identify a specific mobile station in the wireless sub-network.

As GPRS backbone network uses IP tunnel techniques to establish a dedicated communicating tunnel between GGSN 13 and SGSN 12, MS 14 is able to access data of the external packet switching network 15. However, such a technique also results in drawbacks such as increasing the length of the packet header, increasing the IP route delay and difficulty in supporting the quality of service. These drawbacks severely influence the GPRS backbone network transmission efficiency. Therefore, it is desirable for improvements in the above conventional GPRS architecture.

SUMMARY OF THE INVENTION

The object of the present invention is to provide a method and system for applying a multi-protocol label switching (MPLS) network to support Quality of Service (QoS) in general packet radio service (GPRS), which can overcome the aforementioned problems in the prior art.

To achieve the object, the present invention provides a method for applying a Multi-Protocol Label Switching (MPLS) network to support Quality of Service (QoS) in General Packet Radio Service (GPRS). The MPLS includes multiple Label Switch Routers (LSRs) for providing Label Switch Paths (LSPs) established by label stack. The MPLS network defines level 1 label and level 2 label, wherein a level 1 LSP is formed by switching multiple level 1 labels while a level 2 LSP is formed by switching multiple level 2 labels, and the level 1 label of the label stack is used to address routing LSP outside the GPRS core network while the level 2 label of label stack is used to address routing LSP inside the GRPS core network. The packet switching network is connected to at least one corresponding node. The GPRS core network includes at least one Gateway GPRS Support Node (GGSN) connected to the packet switching network and multiple Serving GPRS Support Nodes (SG-SNs), each SGSN connected to base stations (BSs) of at least one wireless access network. The method comprises the steps of: (A) pre-configuring level 2 LSP connections with reserved bandwidth respectively between Gateway GPRS Support Node (GGSN) and each Service GPRS Support Node (SGSN), and between two SGSNs, thereby forming level 2 LSP tunnels with multiple fixed paths; (B) establishing level 1 LSPs on-demand from a corresponding node (CN) to a mobile station (MS), wherein the SGSN establishes a first mapping table for recording relation between MID label and IMSI and NSAPI for MSs when the level 1 LSP is established, and the SGSN accordingly recognizes and locates the MS; and (C) forwarding a packet between the CN and the MS according to the level 1 LSP, wherein when the packet is forwarded to the SGSN, the SGSN finds corresponding IMSI and NSAPI from the first mapping table with reference to the MID label for addressing the MS's location.

The present invention also provides a system for applying a Multi-Protocol Label Switching (MPLS) network to support Quality of Service (QoS) in General Packet Radio Service (GPRS). The MPLS network includes multiple Label Switch Routers (LSRs) for providing Label Switch Paths (LSPs) established by label stack. The MPLS network defines level 1 label and level 2 label, wherein a level LSP is formed by switching multiple level 1 labels while a level 2 LSP is formed by switching multiple level 2 labels. The system comprises: at least one wireless access network; a packet switching network constructed by the MPLS network and connected to at least one corresponding node (CN); and a GPRS core network constructed by the MPLS network. The GPRS core network includes: at least one Gateway GPRS Support Node (GGSN) connected to the packet switching network; and multiple Serving GPRS Support Nodes (SGSNs), each SGSN connected to at least one base station (BS) of the wireless access network. The level 2 LSP connections with reserved bandwidth are pre-configured respectively between Gateway GPRS Support Node (GGSN) and each Service GPRS Support Node (SGSN), and between two SGSNs, thereby forming level 2 LSP tunnels with multiple fixed paths. The level 1 LSP from the corresponding node (CN) to a mobile station (MS) is established on-demand, so that the SGSNs can recognize and locate corresponding MSs.

Other objects, advantages, and novel features of the invention will become more apparent from the following detailed description when taken in conjunction with the accompanying drawings.

DETAILED DESCRIPTION OF THE PREFERRED EMBODIMENT

A method and system for applying a multi-protocol label switching (MPLS) network to support Quality of Service (QoS) in general packet radio service (GPRS) uses the label stack technique to address locations of mobile stations (MSs) in a GPRS core network constructed by MPLS and connects all one-to-one nodes in the GPRS core network using pre-configured Label Switch Paths (LSPs) as reserved with enough bandwidth to assure the QoS. An MPLS network includes multiple Label Switch Routers (LSRs), wherein an LSR for ingress node is referred as the ingress LSR, while another LSR for egress node is referred as the egress LSR. The ingress LSR will map Internet Protocol (IP) addresses of IP packets to associated labels and prefix the labels to the IP packets. By contrast, the egress LSR will map the labels to the IP addresses and remove the labels. The other LSRs are responsible for swapping the labels of the IP packets. In addition, for connection or disconnection signal, the ingress LSR is responsible for classifying data packets into different QoS classes, monitoring and policing data packets, performing Connection Admission Control (CAC) and so on. The egress LSR is responsible for removing the labels of the packets and mapping the corresponding QoS classes to the associated QoS classes of non-MPLS networks. Data packets to be forwarded in the MPLS network will distribute the mappings of the labels and data-link layer ports to the LSRs along routed path and thus establish a specific LSP. The packets with the labels only need to swap their labels in the data link layer without reading every packet's IP address and header when passing through the LSRs.

Figure 3:
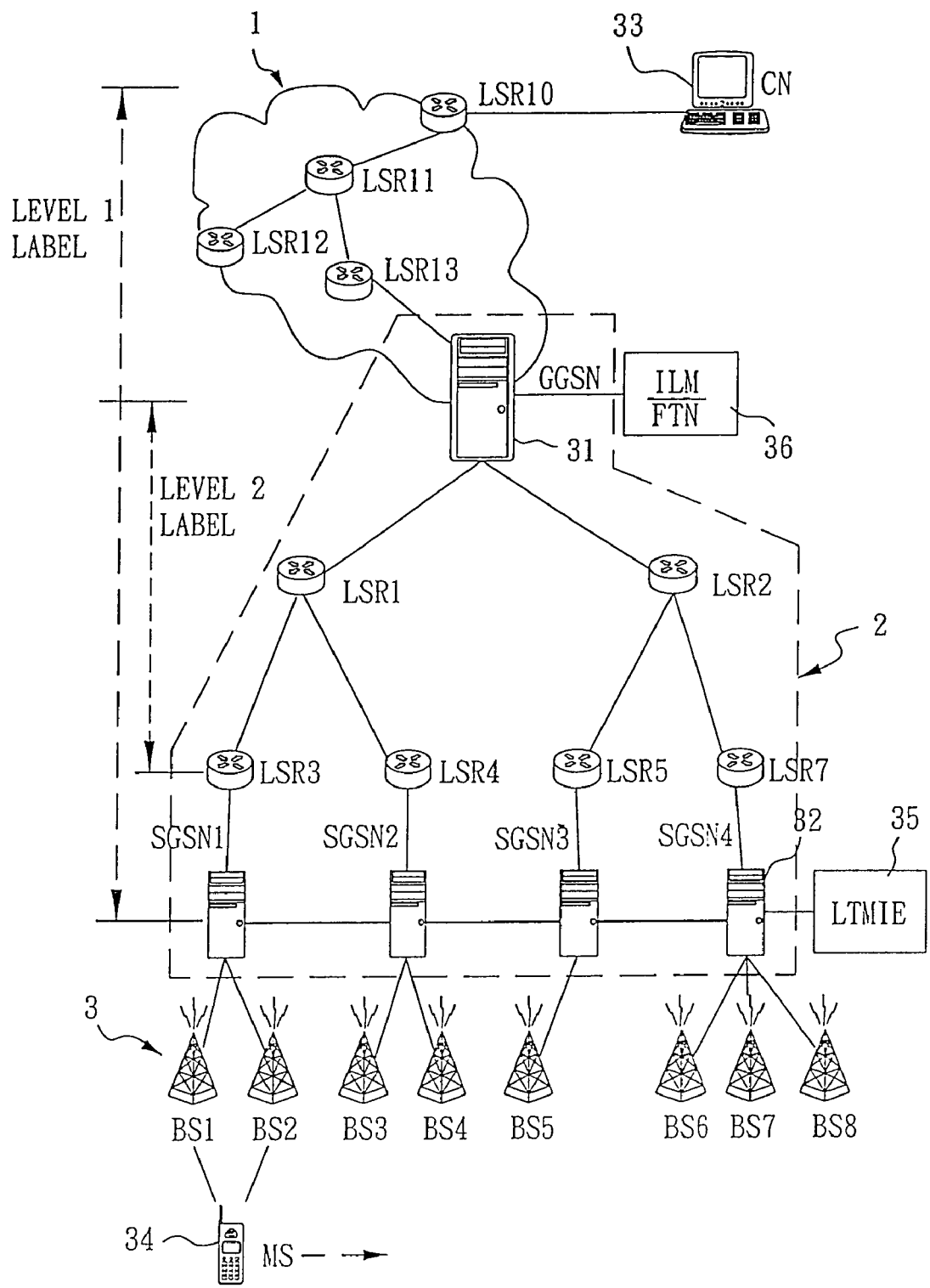
FIG. 3 shows system architecture for applying an MPLS network to support QoS in GPRS in accordance with the present invention.

FIG. 3 shows the system architecture for applying an MPLS network to support QoS in GPRS in accordance with the present invention. In FIG. 3, a packet switching network 1 and a GPRS core network 2 constructed by the MPLS network are shown. The MPLS network includes multiple LSRs for providing LSPs established by label stack. The MPLS network defines a level 1 label and a level 2 label. The level 1 label of label stack is used to address routing LSP outside the GPRS core network 2, while the level 2 label of label stack is used to address routing LSP inside the GRPS core network 2. The packet switching network 1 is connected to at least one corresponding node (CN) 33. The GPRS core network 2 includes at least one Gateway GPRS Support Node (GGSN) 31 connected to the packet switching network and multiple Serving GPRS Support Nodes (SGSNs) 32, each SGSN connected to base stations (BSs) of at least one wireless access network 3.

A level 2 LSP connection with reserved bandwidth is pre-configured respectively between Gateway GPRS Support Node (GGSN) and each Service GPRS Support Node (SGSN), and between two SGSNs, thereby forming level 2 LSP tunnels with multiple fixed paths.

The cited LSP tunnel from GGSN 31 to SGSN 32 is accomplished by a label stack with level 1 label and level 2 label. A level 1 LSP is formed by switching multiple level 1 labels, while a level 2 LSP is formed by switching multiple level 2 labels.

Figure 4:
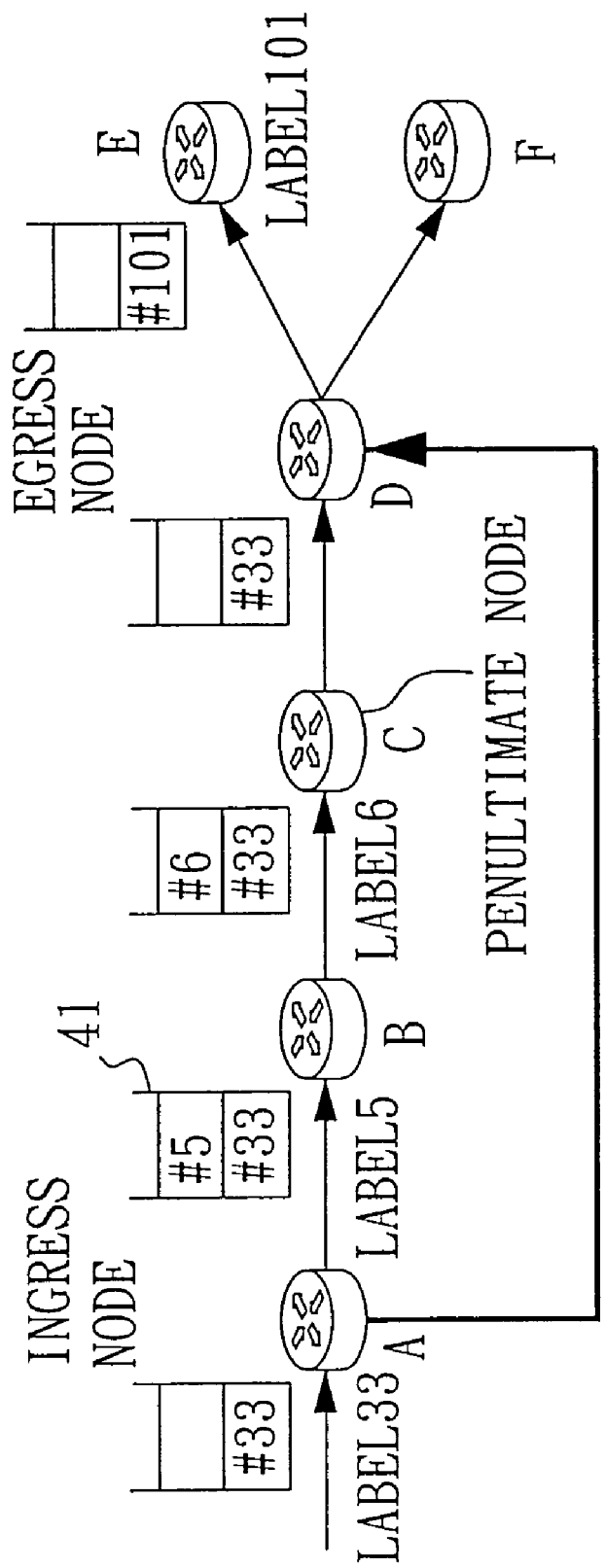
FIG. 4 is tunnel forwarding accomplished by applying the label stack technique from MPLS in an LSP tunnel.

With reference to FIG. 4, there is shown that the cited LSP tunnel uses the label stack technique from MPLS to accomplish tunnel forwarding action. The cited tunnel is an LSP with <LSR A, LSR B, LSR C, LSR D>, where LSR A is ingress node and LSR D is egress node. When a packet enters in LSR A, label 5 is pushed into a label stack 41 for representing that the packet has entered into the tunnel. Subsequent label operations in the tunnel are performed on the top of the label stack 41. When the packet arrives an LSR that is a preceding LSR to the egress node (defined as a penultimate node), the penultimate node (LSR C) performs a pop operation for label 6 before the packet is forwarded to the egress node (LSR D). The egress node will swap label 33 with label 101 and forward the packet directly to LSR E.

In the MPLS standard, it defines two constraint-based routed LSPs with QoS control, i.e., L-LSP (Label-Only-Inferred-PSC LSP) and E-LSP (EXP-Inferred-PSC LSP). The L-LSP can only support one class of service (CoS), which only uses labels to determine CoS used by a link. The E-LSP can support up to 8 CoS, which uses a 3-bit EXP field (defined in MPLS's header) to determine CoS used by a link.

With reference to FIG. 3 again, the cited label 1 LSP is an L-LSP from the CN 33 to SGSN 32 across the GPRS core network between GGSN 31 and SGSN 32, such that SGSN 32 can recognize and locate corresponding MS 34. The cited label 2 LSP is an E-LSP tunnel established in the GPRS core network 2 from GGSN 31 to SGSN 32. The E-LSP tunnel is configured in the system network initialization, i.e., the system network establishes a number of E-LSPs between GGSN 31 and each SGSN 32 at initialization and reserves adequate bandwidth based on bandwidth reservation analysis, thereby sharing the bandwidth.

Figure 1:
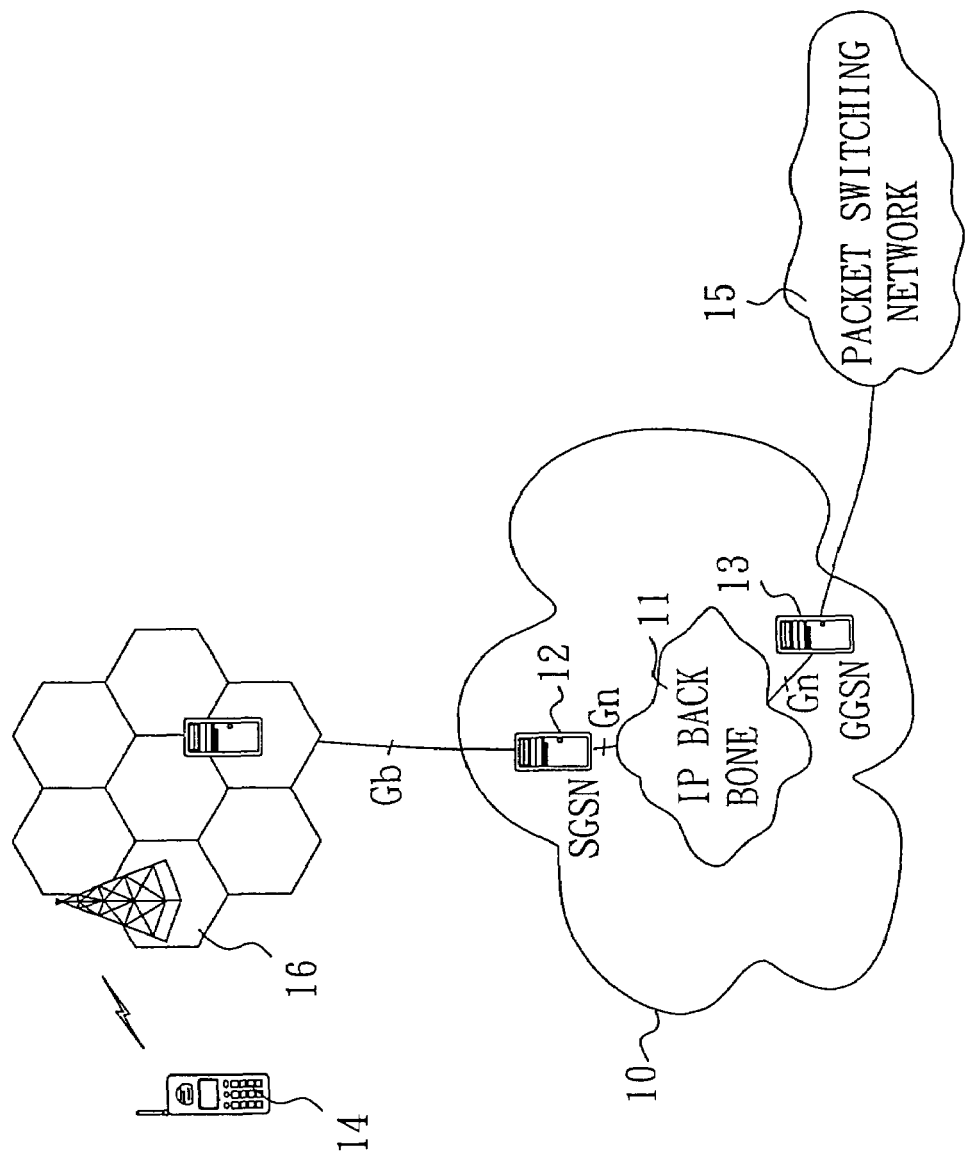
FIG. 1 shows a conventional GPRS core network and its architecture.
Figure 2:
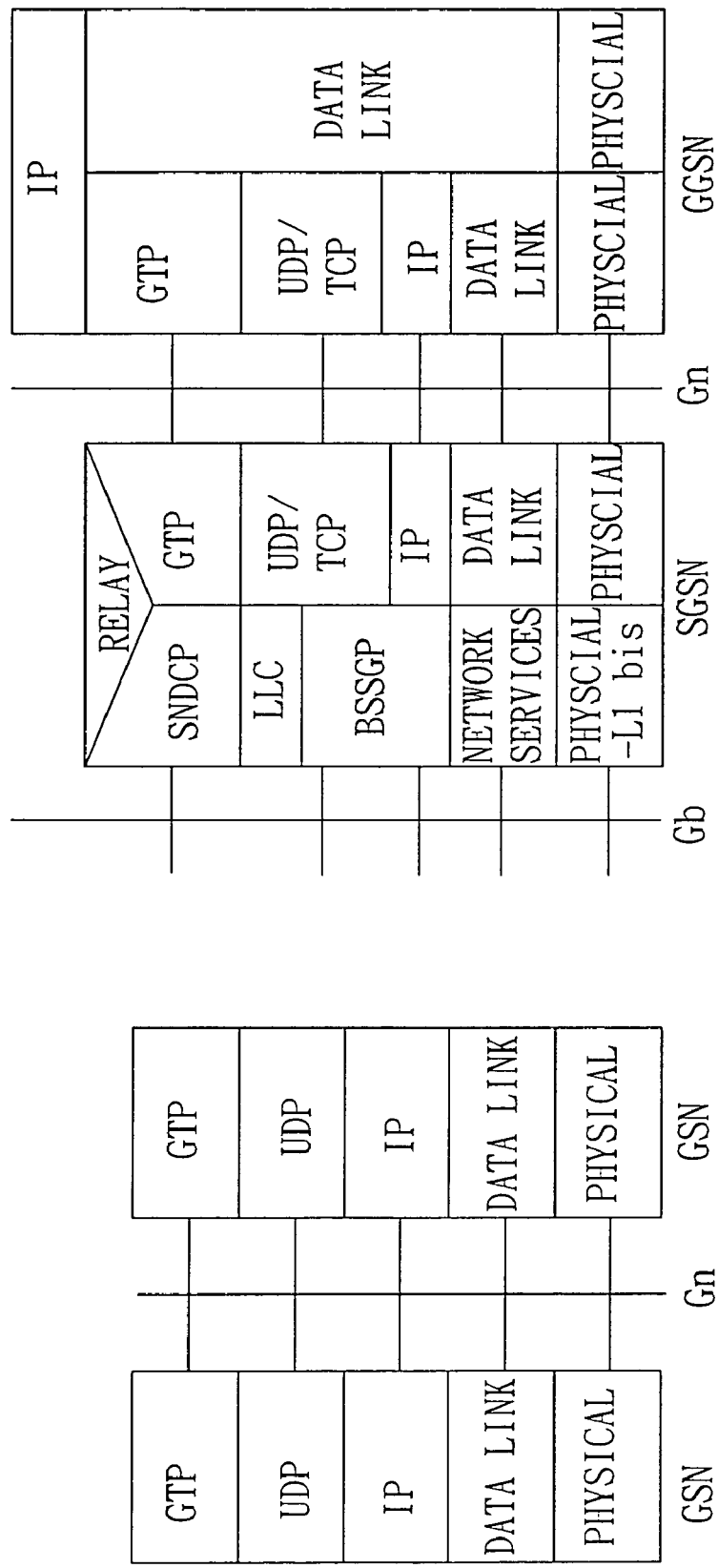
FIG. 2 shows the signaling plane and transmission plane at the Gn interface of conventional GPRS architecture.

The present invention applies a mechanism of signaling plane, other than a GTP header to recognize and locate the MS 34 (as shown in FIG. 2) in the prior art, to SGSN 32 for recognizing the MS 34. This is further shown in the inventive Gn interface protocol stacks of FIG. 5, wherein the level 1 label of MPLS label stack replaces the GTP layer in a typical transmission plane to recognize corresponding MS(s).

Figure 5:
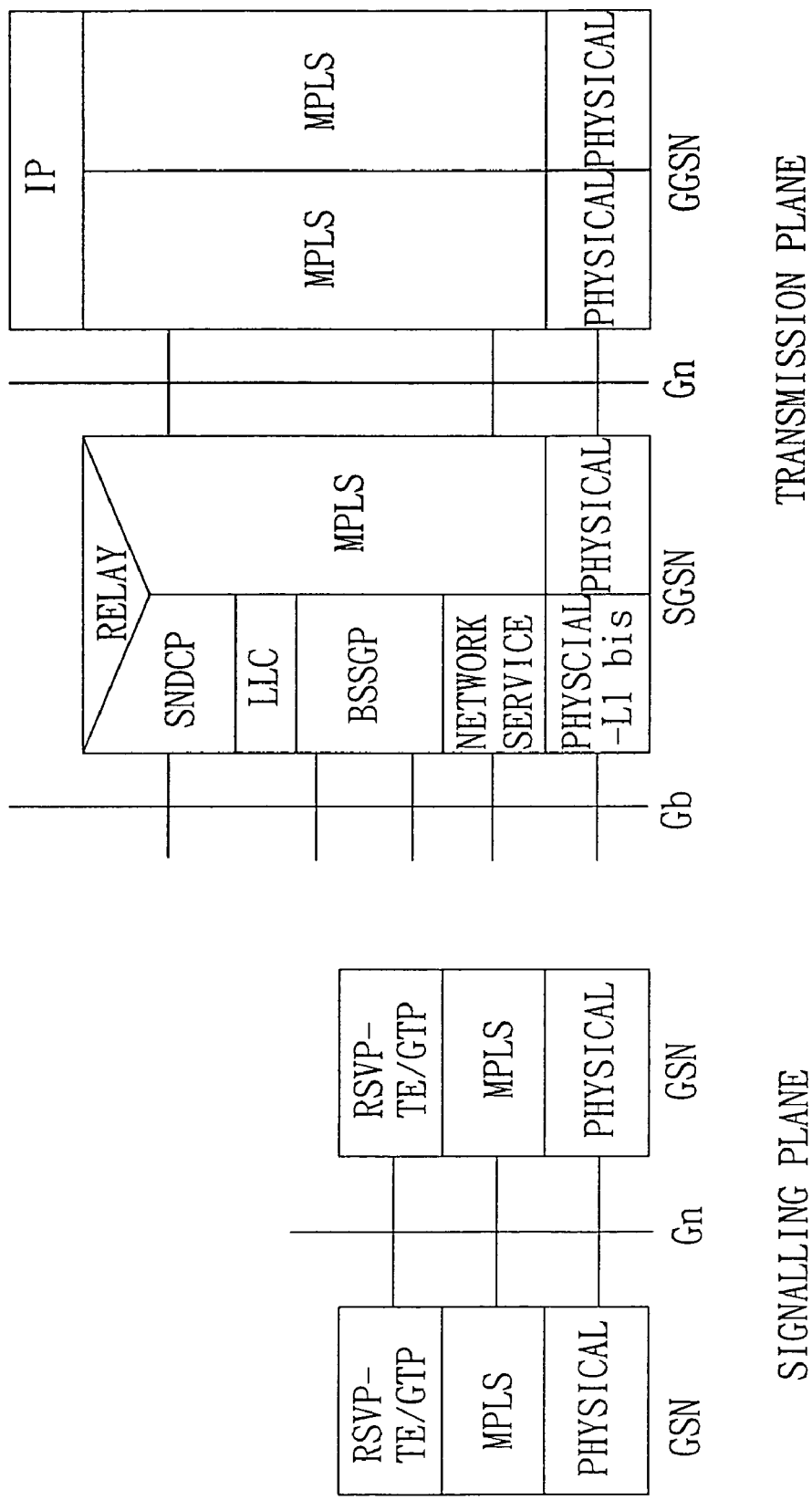
FIG. 5 shows Gn interface protocol stacks of FIG. 3 in accordance with the present invention.

With reference to FIGS. 3 and 5, the inventive system establishes downlink real-time data stream in the following steps:

(1) When CN 33 is ready to send data to a specific mobile station (MS) 34 in the GPRS network, the ingress node (LSR10) regards the prefix of host IP address of the MS 34 as Forwarding Equivalent Class (FEC) and starts to establish an L-LSP tunnel to GGSN 31.

(2) When the L-LSP tunnel is establishing, the corresponding ingress node of CN sends control packet with label request to GGSN 31 along routed path while GGSN 31 finds MSs with IP prefixes met with the FEC and further uses local IP of each MS as an FEC in order to send remote label request to corresponding SGSN 32.

(3) The SGSN 32 retrieves the FEC (MS's local IP address) from the remote label request when it receives the remote label request sent by GGSN 31, reserves an MID label for the FEC to response to GGSN 31, and searches corresponding PDP context based on the FEC. When SGSN 32 retrieves IMSI and NSAPI of the MS 34 from the PDP context, relation between the MID label and the IMSI and NSAPI is established and recorded in an item of the mapping table 35 of an LTMIE (Label to MS Identify Entry).

(4) As soon as GGSN 31 receives any label response sent by SGSN 32, it reserves a level 1 label to response to the upstream LSR also records the label into a ILM (Incoming Label Mapping) mapping table, and thus completes establishment of level 1 L-LSP.

(5) GGSN 31 creates an individual FTN (FEC to Next Hop Label Forwarding Entry) for every label response sent by SGSN 32, wherein each FTN records relation between level 2 label and relation of IP address and MID label for MSs, and concurrently completes establishment of remote level 1 L-LSP.

For the steps of signaling plane, when a packet with labels is sent to SGSN 32, SGSN 32 can find required items from LTMIE mapping table 35 based on the level 1 MID label and retrieve IMSI, NSAPI from the items to address MS's location with respect to the packet.

For the transmission plane of GGSN 31, with reference to FIGS. 3 and 5, data packet is forwarded as the following steps.

(1) When data streams are from CN 33 to MS 34, data packets are sent to level 1 LSP tunnel via ingress node (LSR10) and reaches GGSN 31.

(2) GGSN 31 searches corresponding ILM mapping table 36 when it receives a packet with labels sent by upper LSR, pops level 1 label and sends the same to IP layer for further processing.

(3) When IP layer of GGSN 31 sees destination location (IP address of MS 34), GGSN 31 uses local IP address of MS 34 as FEC to search corresponding FTN, and adds MID label and level 2 label in front of IP header according to the result of searching FTN.

(4) GGSN 31 forwards the packet to level 2 E-LSP between GGSN 31 and SGSN 32.

For the transmission plane of SGSN 32, when the packet with labels passes through a penultimate node, level 2 label is popped and sent to SGSN 32, so the packet has only level 1 label. At this point, SGSN 32 pops level 1 MID label of the packet with label and searches IMSI and NSAPI corresponding to MS 34 in LTMIE mapping table 35 using the MID label. When SGSN 32 finds the IMSI and NSAPI, the data packet is forwarded to corresponding MS 34 via a wireless access network 3.

Figure 6:
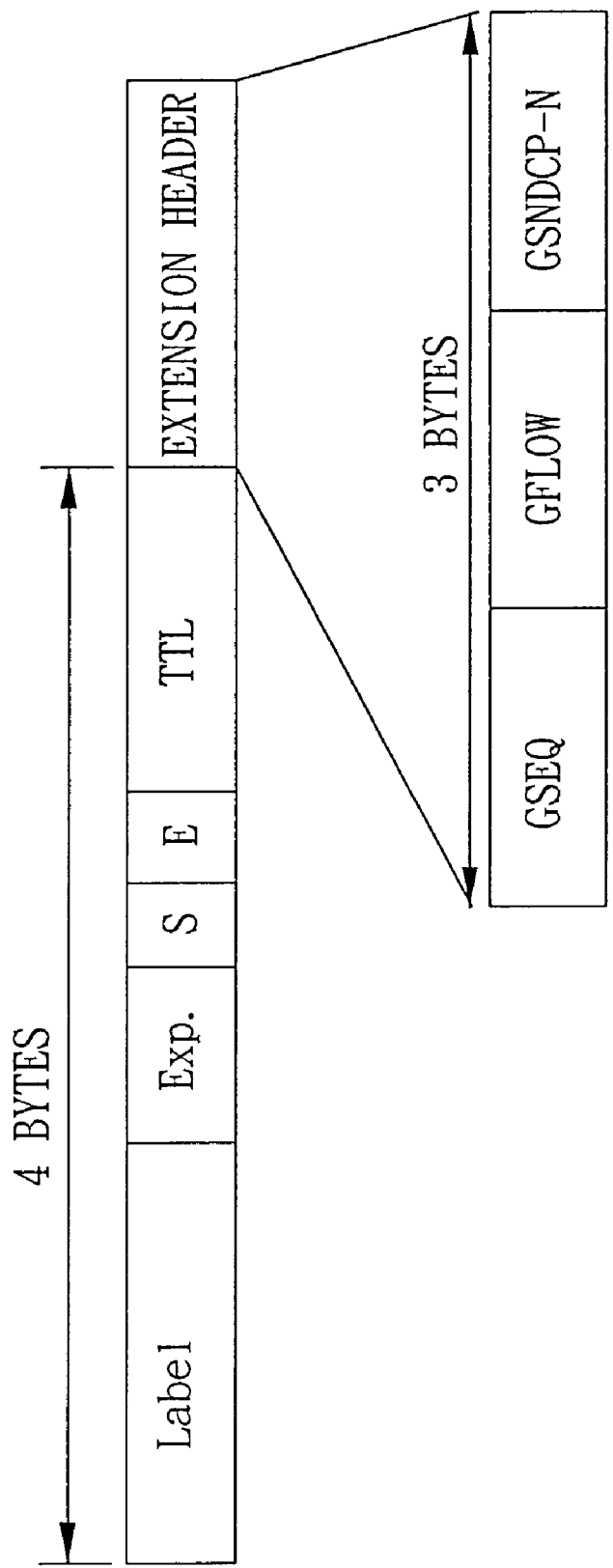
FIG. 6 shows MPLS header format of a packet in accordance with the present invention.

Because GTP layer in the transmission plane is removed in this embodiment, in order to support partial field functions of original GTP header, for example, sequence number, flow label, SNDCP N-PDULLC number, a solution is shown in FIG. 6. In FIG. 6, one bit of TTL of packet's MPLS header in the GPRS core network is defined as an extension field (E-flag) of MPLS header to indicate having extension header or not. When E-flag is 1, it indicates an MPLS header with extension header. Such a way allows MID label to have extension header and keeps partial field functions of original GTP when data reaches SGSN 32.

When MS 34 moves from an SGSN 32 to an area controlled by a new SGSN, smooth handoff is a problem to be solved and re-addressing MS is required after handoff. In order that level 1 L-LSP can change its level 2 tunnel from level 2 E-LSP with respect to old SGSN 32 to level 2 E-LSP with respect to new SGSN and immediately addressed to MS 34, it requires to set MID label as global unique identify, namely, the MID label for MS 34 is fixed in all SGSN 32's control areas.

Figure 7:
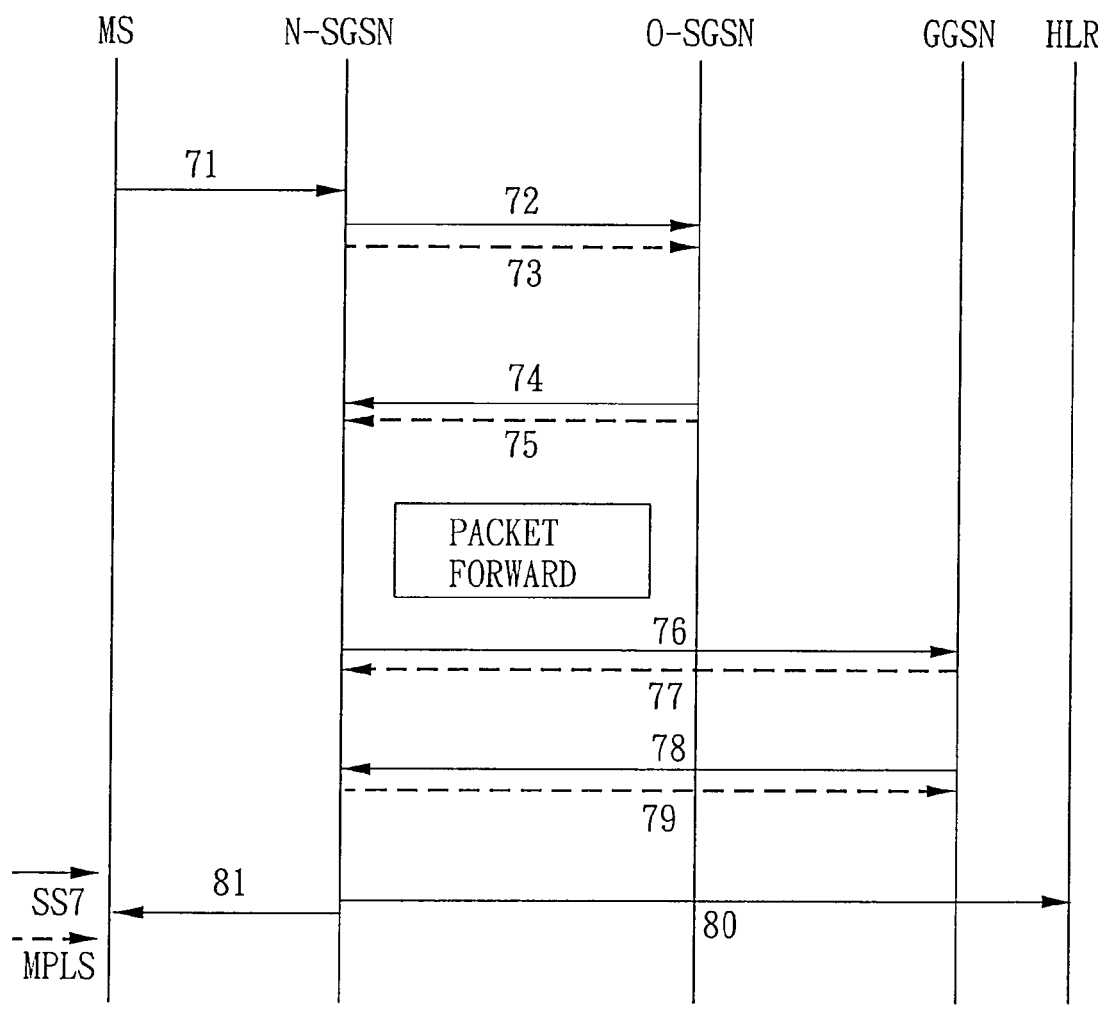
FIG. 7 shows a handoff message flowchart of a method for applying an MPLS to support QoS in GPRS in accordance with the present invention.

FIG. 7 shows a handoff message flow, which illustrates steps of the cited smooth handoff and re-addressing MS. When MS moves to an area controlled by a new SGSN (N-SGSN), a procedure for Inter-SGSN handoff is started. In the procedure, MID label forwarding is activated with each signal for Inter-SGSN handoff. As shown in FIG. 7, first, MS sends RA (routing area) update request 71 to N-SGSN. When N-SGSN sends SGSN context request 72 to old SGSN (O-SGSN), MID label request 73 is also sent for requesting the MS's MID label to O-SGSN after handoff entrance. Next, a corresponding LTMIE mapping table is established in N-SGSN such that packet can be forwarded from O-SGSN to N-SGSN via pre-configured E-LSP tunnel. Finally, when GGSN receives update PDP context request 76 sent by N-SGSN, it updates corresponding MS's PDP context. GGSN subsequently updates update tunnel request 77 of corresponding MS's level 2 E-LSP, so that level 1 L-LSP can be forwarded to N-SGSN, not to O-SGSN, after handoff. Every signal in FIG. 7 is described in detail as follows:

71: RA update request
72: SGSN context request
73: MID label request
74: SGSN context response
75: MID label response
76: update PDP context request
77: update tunnel request
78: update PDP context response
79: update tunnel response
80: update location
81: RA update response The invention is constructed by MPLS LSP tunnel technique to support QoS control of real-time data stream transmission. LSP of double label stacks is applied to each real-time data steam for being forwarded between CN and SGSN. Level 1 is provided for LSP transfer outside the GPRS core network and connects to particular SGSN 32 at GGSN 31 across the GPRS core network 2. Namely, connecting from LSR located by CN 33 to SGSN 32 located by MS 34 through GGSN 31 and GPRS core network 2 is constructed by L-LSP to support a single service class. Level 1 can provide host(s) in the same sub-network as CN 33 to share bandwidth and link to MS(s) controlled by the same or different SGSN 32. L-LSP outside the GPRS core network 2 can be randomly established upon a user requirement and can dynamically reserve bandwidth on-demand. Level 2 is provided for LSP transfer inside the GPRS core network. Namely, connecting from GGSN 31 to SGSN 32 located by MS 34 is constructed by E-LSP to support up to eight service classes. Level 2 is an E-LSP tunnel for the same destination as SGSN 32 to forward real-time data streams between a GGSN 31 and an SGSN 32 on L-LSP. In addition, E-LSP is also established between two SGSN 32 to support MS's smooth handoff. E-LSP inside the GPRS core network 2 can be pre-configured in system initialization with static or dynamic bandwidth reservation on-demand. Bandwidth reservation is described hereinafter.

For address routing requirement, as aforementioned, level 1 label of label stack is used to address routing L-LSP outside the GPRS core network 2 while level 2 label of label stack is used to address routing E-LSP inside the GPRS core network 2. L-LSP's QoS and bandwidth sharing is classified directly by level 1 label, while E-LSP's QoS and bandwidth sharing is classified directly by level 2 label and MPLS header's EXP field.

The cited pre-configured level 2 E-LSP (abbreviated as E-LSP) in the GPRS core network 2 can use tunneling technique to deliver packet with QoS request. E-LSP is constructed one-to-one between GGSN 31 and each SGSN 32 and between every two SGSNs 32. Each E-LSP can support up to eight service classes. In addition, bandwidth reservation for each E-LSP can be dynamic on-demand or static with fixed pre-reservation. Bandwidth sharing is classified by purpose into the following two types:

(1) Support bandwidth sharing for the GPRS core network part of real-time streams in an MS: In such a bandwidth sharing, E-LSP establishes tunnels in the GPRS core network 2, such that all real-time data streams (i.e., L-LSP) entering in the core network 2 will push a new label in MPLS label stack. The new label is routed to pass through a specific E-LSP to SGSN 32 located by MS 34. The bandwidth requirement of each E-LSP is determined accordingly varied with quantity of L-LSPs and desired QoS of each L-LSP passing through the corresponding E-LSP. Hence, its bandwidth reservation can be dynamically adjusted by Connection Admission Control (CAC) according to the total bandwidth requirement of all L-LSPs passing through.

(2) Support Bandwidth Sharing for the Real-time Streams in an MS during inter-SGSN handoff: In such a bandwidth sharing, E-LSP for supporting inter-SGSN handoff (henceforth referred to as handoff E-LSP) only forwards MS's packets between SGSN 32 in order to assure the QoS requirement of MS 34 during handoff. The bandwidth reservation for such handoff E-LSP is static, i.e., system has to calculate required pre-reservation bandwidth based on handoff probability of MS performing handoff between two specific SGSNs 32.

In the GPRS core network, the cited two types of E-LSPs can be concurrently established, but respectively reserved required bandwidth. Required bandwidth reservation by handoff E-LSP for supporting handoff is estimated by a bandwidth estimation model.

Figure 8:
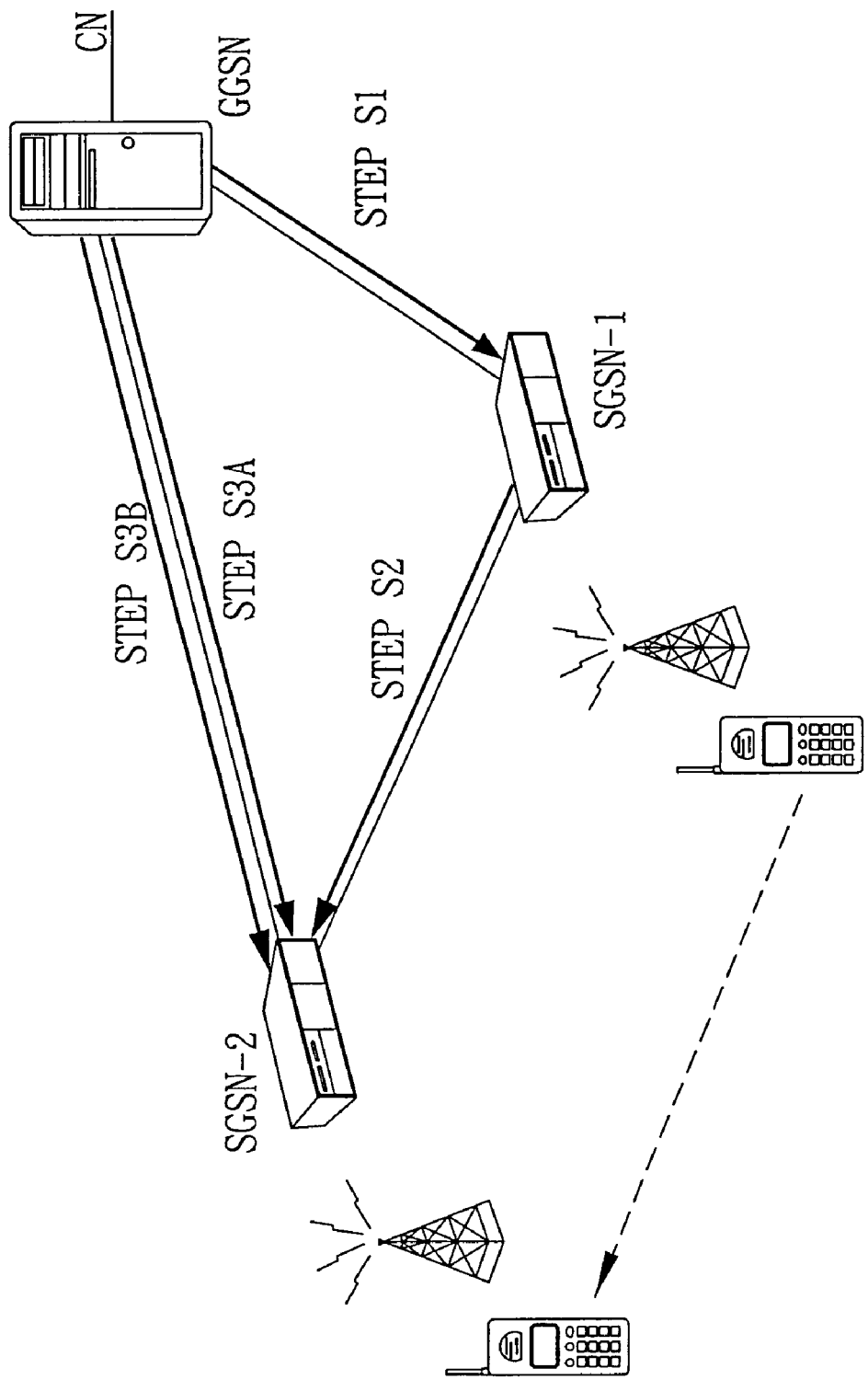
FIG. 8 shows a flowchart of a handoff procedure between SGSNs in accordance with the inventive method for applying an MPLS to support QoS in GPRS.

With reference to FIG. 8, an old L-LSP established by CN on-demand passes through an E-LSP tunnel to SGSN-1 (step S1). When real-time data stream performs an inter-SGSN handoff, MS is moved from SGSN-1 (O-SGSN) to SGSN-2 (N-SGSN). SGSN-1 forwards data streams to MS through E-LSP handoff (step S2). At this point, one of two situations as follows will be occurred:

Situation 1 (step S3A): When a new path between GGSN and SGSN 2 remains sufficient bandwidth to support the real-time data streams just entering after handoff, E-LSP bandwidth in the new path is extended for tunneling a pair of on-demand L-LSPs entering in the GPRS core network 2.

Situation 2 (step S3B): When a new path between GGSN and SGSN 2 remains insufficient bandwidth to support the real-time data streams just entering after handoff, GGSN needs to send a negotiation signal for decreasing the service-classes of required L-LSPs to CN 33, and a pair of required LSPs entering in the GPRS core network 2 need to use a handoff E-LSP in the new path for tunneling packets before the negotiation signal is complete.

A bandwidth estimation mathematical model $B(m,\lambda_h/\mu)$ established by Erlang B equation is used to estimate required bandwidth reservation, where m is MS quantity for concurrently sharing a same handoff E-LSP; $\lambda_h$ is the average numbers of real-time streams in a second while the corresponding MSs are performing handoff between two particular adjacent SGSNs (i.e., O-SGSN and N-SGSN); $1/\mu$ has two representatives, one for average inter-SGSN handoff time as handoff E-LSP is between O-SGSN and N-SGSN, and the other for negotiation time to decrease the service-classes of required L-LSPs at the cited situation 2, which is between GGSN and N-SGSN. Finally, it is assumed that expected blocking probability Pm (for example, Pm≦2%) is set and $\lambda_h$ and $1/\mu$ are known, m can be derived from Erlang B equation and further estimation bandwidth for a handoff E-LSP is obtained.

Although the present invention has been explained in relation to its preferred embodiment, it is to be understood that many other possible modifications and variations can be made without departing from the spirit and scope of the invention as hereinafter claimed.

What is claimed is:

1. A method for applying a Multi-Protocol Label Switching (MPLS) network to support Quality of Service (QoS) in General Packet Radio Service (GPRS), the MPLS including multiple Label Switch Routers (LSRs) for providing Label Switch Paths (LSPs) established by label stack, the MPLS network defining level 1 label and level 2 label, wherein a level 1 LSP is formed by switching multiple level 1 labels while a level 2 LSP is formed by switching multiple level 2 labels, and the level 1 label of the label stack is used to address routing LSP outside the GPRS core network while the level 2 label of label stack is used to address routing LSP inside the GRPS core network, the packet switching network being connected to at least one Corresponding Node (CN), the GPRS core network including at least one Gateway GPRS Support Node (GGSN) connected to the packet switching network and multiple Serving GPRS Support Nodes (SGSNs), each SGSN connected to base stations (BSs) of at least one wireless access network, the method comprising the steps of:

(A) pre-configuring level 2 LSP connections with reserved bandwidth respectively between Gateway GPRS Support Node (GGSN) and each Service GPRS Support Node (SGSN), and between two SGSNs, thereby forming level 2 LSP tunnels with multiple fixed paths;

(B) establishing level 1 LSPs on-demand from a corresponding node (CN) to a mobile station (MS), wherein the SGSN establishes a first mapping table for recording relation between Merge ID (MID) label and International Mobile Subscriber Identifier (IMSI) and Network Layer Service Subscriber Access Point Identifier (NSAPI) for MSs when the level 1 LSP is established, and the SGSN accordingly recognizes and locates the MS; and (C) forwarding a packet between the CN and the MS according to the level 1 LSP, wherein when the packet is forwarded to the SGSN, the SGSN finds corresponding IMSI and NSAPI from the first mapping table with reference to the MID label for addressing the MS's location.

2. The method as claimed in claim 1, wherein the level 1 LSP is L-LSP (Label-Only-Inferred-PSC LSP) to support one QoS (Quality of Service) class while level 2 LSP is E-LSP (EXP-Inferred-PSC LSP) to concurrently support various QoS classes.

3. The method as claimed in claim 2, wherein in step (B), the level 1 LSP is established by following steps:
   (B1) an ingress LSR of CN using the MS's home IP address prefix as Forwarding Equivalent Class (FEC), and establishing an L-LSP tunnel to the GGSN;
   (B2) the ingress LSR sending a label request to the GGSN when the L-LSP tunnel is establishing, and the GGSN finding all MSs with IP prefixes met with the FEC from the GGSN's PDP context and further sending remote label request to corresponding SGSN by applying each MS's local IP as an FEC;
   (B3) the SGSN retrieving the FEC from the remote label request when the SGSN receives the remote label request sent by the GGSN, reserving an MID label for the FEC to response to GGSN 31, and searching corresponding PDP context based on the FEC to obtain the MS's IMSI and NSAPI and accordingly establish relation between the MID label and the IMSI and NSAPI for being recorded in the first mapping table;
   (B4) the GGSN reserving a level 1 label to response to upstream LSR and recording the same in an ILM (Incoming Label Mapping) mapping table as soon as the GGSN receives any label response sent by the SGSN, and thus completing establishment of level 1 L-LSP; and
   (B5) the GGSN 31 creating an individual FTN (FEC to Next Hop Label Forwarding Entry) for every label response sent by the SGSN, and also completing establishment of remote level 1 L-LSP.

4. The method as claimed in claim 2, wherein step (C) further comprises:
   (C1) sending data packets to the level 1 LSP (L-LSP) via the ingress LSR of CN for reaching the GGSN;
   (C2) searching the Incoming Label Mapping (ILM) mapping table when the GGSN receives a labeled packet sent by upstream LSR, popping label and sending the same to IP layer for further processing;
   (C3) using the MS's local IP address as the FEC to search corresponding FEC to Next Hop Label Forwarding Entry (FTN) when the GGSN's IP layer sees destination location, and adding the MID label and level 2 label in front of IP header according to the result of searching FTN; and
   (C4) the GGSN forwarding the packet to level 2 LSP tunnel (E-LSP) between GGSN and SGSN.

5. The method as claimed in claim 4, further comprising:
   (C5) SGSN popping level 1 MID label of the label packet and searching IMSI and NSAPI corresponding to the MS in the first mapping table using the level 1 MID label to forward the data packet to corresponding MS via the wireless access network.

6. The method as claimed in claim 5, wherein the level 1 MID label is a global unique identify.

7. The method as claimed in claim 5, further comprising an inter-SGSN handoff procedure for allowing the MS to move from a first SGSN to an area controlled by a second SGSN, the inter-SGSN handoff procedure comprising following steps:
   (D1) sending an SGSN context request from the second SGSN to the first SGSN for requesting the MID label of the MS after handoff entrance;
   (D2) establishing corresponding first mapping table in the second SGSN such that packet can be forwarded from the first SGSN to the second SGSN via level 2 LSP tunnel pre-configured; and
   (D3) updating the MS's PDP context and level 2 LSP label when the GGSN receives update PDP context request sent by the second SGSN, so that the level 1 LSP can be forwarded from GGSN to the second SGSN via the level 2 LSP tunnel.

8. The method as claimed in claim 2, wherein each L-LSP bandwidth depends on total required bandwidth on-demand.

9. The method as claimed in claim 2, wherein each E-LSP bandwidth is pre-reserved as a constant.

10. The method as claimed in claim 9, wherein the bandwidth requirement of each E-LSP is determined accordingly varied with quantity of L-LSPs and desired QoS of each L-LSP passing through the corresponding E-LSP, and the bandwidth reservation is dynamically adjusted according to the total bandwidth requirement of all L-LSPs passing through.

11. The method as claimed in claim 7, wherein the E-LSP only forwards MS's packets on handoff, which performs a handoff between SGSNs to assure that the MS has QoS guarantee during handoff, and the E-LSP's bandwidth reservation is static.

12. The method as claimed in claim 11, wherein the E-LSP's bandwidth reservation is calculated based on the inter-SGSN handoff rate of MSs between two specific SGSNs.

13. A system for applying a Multi-Protocol Label Switching (MPLS) network to support Quality of Service (QoS) in General Packet Radio Service (GPRS), the MPLS network including multiple Label Switch Routers (LSRs) for providing Label Switch Paths (LSPs) established by label stack, the MPLS network defining level 1 label and level 2 label, wherein a level 1 LSP is formed by switching multiple level 1 labels while a level 2 LSP is formed by switching multiple level 2 labels, the system comprising:
   at least one wireless access network;
   a packet switching network constructed by the MPLS network and connected to at least one corresponding node (CN); and
   a GPRS core network constructed by the MPLS network, including:
   at least one Gateway GPRS Support Node (GGSN) connected to the packet switching network; and
   multiple Serving GPRS Support Nodes (SGSNs), each SGSN connected to at least one base station (BS) of the wireless access network,
   wherein level 2 LSP connections with reserved bandwidth are pre-configured respectively between Gateway GPRS Support Node (GGSN) and each Service GPRS Support Node (SGSN), and between two SGSNs, thereby forming level 2 LSP tunnels with multiple fixed paths, and level 1 LSP from the corresponding node (CN) to a mobile station (MS) is established on-demand, so that the SGSNs can recognize and locate corresponding MSs.

14. The system as claimed in claim 13, wherein the level 1 LSP is L-LSP (Label-Only-Inferred-PSC LSP) to support one QoS (Quality of Service) class while level 2 LSP is E-LSP (EXP-Inferred-PSC LSP) to concurrently support various QoS classes.

15. The system as claimed in claim 14, wherein when the level 1 LSP is established, the SGSN establishes a first mapping table to record relation between the Merge ID (MID) label and the International Mobile Subscriber Identifier (IMSI) and Network Layer Service Subscriber Access Point Identifier (NSAPI) for MSs while the GGSN establishes an FEC to Next Hop Label Forwarding Entry (FTN) mapping table to record relation between IP address of MS and MID label of MS, and between IP address of MS and level 2 label.

16. The system as claimed in claim 15, wherein the level 1 MID label is global unique identify.

\* \* \* \* \*